(12) United States Patent
White et al.

(10) Patent No.: US 9,698,706 B2
(45) Date of Patent: Jul. 4, 2017

(54) ELECTRO-HYDRODYNAMIC SYSTEM

(71) Applicant: Accio Energy, Inc., Ann Arbor, MI (US)

(72) Inventors: Dawn White, Ann Arbor, MI (US); Randy Stevenson, Saline, MI (US)

(73) Assignee: Accio Energy, Inc., Ann Arbor, MI (US)

( * ) Notice: Subject to any disclaimer, the term of this patent is extended or adjusted under 35 U.S.C. 154(b) by 735 days.

(21) Appl. No.: 13/948,501

(22) Filed: Jul. 23, 2013

(65) Prior Publication Data

US 2013/0313942 A1  Nov. 28, 2013
US 2017/0133955 A9  May 11, 2017

Related U.S. Application Data

(63) Continuation of application No. 13/632,974, filed on Oct. 1, 2012, now Pat. No. 8,502,507, and a (Continued)

(51) Int. Cl.
  *H02N 3/00* (2006.01)
  *H02N 1/00* (2006.01)

(52) U.S. Cl.
  CPC .............. *H02N 3/00* (2013.01); *H02N 1/00* (2013.01)

(58) Field of Classification Search
  CPC .................................. H02N 3/00; H02N 1/00
  (Continued)

(56) References Cited

U.S. PATENT DOCUMENTS 414,943 A   11/1889   Dewey
416,972 A   12/1889   Thomas
(Continued)

FOREIGN PATENT DOCUMENTS

CN   102629689 B   5/2014
CN   102016574 B   9/2014
(Continued)

OTHER PUBLICATIONS

Marks, "Wind Power Charged Aerosol Generator", Final Technical Report for the period Oct. 1975 to Jun. 1976, prepared for the National Science Foundation under Contract/Grant No. AER-74-18650, Jul. 1980.*

(Continued)

*Primary Examiner* — Burton Mullins
(74) *Attorney, Agent, or Firm* — Jeffrey Schox; Diana Lin (57) ABSTRACT

An electro-hydrodynamic system including an energy harvester and an adjustable member, wherein the energy harvester includes a charge source including: an injector configured to emit particles into a wind stream and an electrode configured to charge the particles to a first polarity and to generate a first electric field. The adjustable member supports the energy harvester, and is configured to control a distance between electrical ground and at least one component of the energy harvester. A method for controlling the electric field magnitude of an electro-hydrodynamic system including placing an energy harvester comprising a charge source at a distance away from electrical ground, the distance being an equilibrium distance; receiving a first measurement of a parameter indicative of electric field magnitude near the charge source; and in response to the first measurement surpassing a threshold, increasing the distance between the energy harvester and electrical ground.

16 Claims, 6 Drawing Sheets

Related U.S. Application Data continuation-in-part of application No. 13/932,957, filed on Jul. 1, 2013, now Pat. No. 8,878,150, which is a continuation of application No. 13/333,797, filed on Dec. 21, 2011, now Pat. No. 8,502,181, which is a continuation of application No. 12/357,862, filed on Jan. 22, 2009, now Pat. No. 8,421,047.

(60) Provisional application No. 61/617,632, filed on Mar. 29, 2012, provisional application No. 61/011,701, filed on Jan. 22, 2008, provisional application No. 61/066,650, filed on Feb. 22, 2008, provisional application No. 61/199,598, filed on Nov. 18, 2008.

(58) Field of Classification Search
USPC ........ 290/54–55; 310/10, 300, 308; 322/2 A
See application file for complete search history.

(56) References Cited

U.S. PATENT DOCUMENTS

| | | | |
|---|---|---|---|
| 450,434 A | 4/1891 | Thomas | |
| 597,832 A | 1/1898 | Palmer | |
| 597,833 A | 1/1898 | Palmer | |
| 631,994 A | 8/1899 | Montague | |
| 911,260 A | 2/1909 | Pennock | |
| 1,014,719 A | 1/1912 | Pennock | |
| 2,638,555 A | 5/1953 | Marks | |
| 3,121,196 A | 2/1964 | Kasemir | |
| 3,138,919 A | 6/1964 | Deutsch | |
| 3,191,077 A | 6/1965 | Marks et al. | |
| 3,309,546 A | 3/1967 | Boll | |
| 3,411,025 A | 11/1968 | Marks | |
| 3,489,669 A | 1/1970 | Ruhnke | |
| 3,518,461 A | 6/1970 | Marks | |
| 3,579,245 A * | 5/1971 | Berry | B41J 2/035 239/3 |
| 3,586,907 A | 6/1971 | Beam et al. | |
| 3,638,054 A * | 1/1972 | Honigsbaum | H02N 3/00 310/10 |
| 3,792,293 A | 2/1974 | Marks | |
| 3,960,505 A | 6/1976 | Marks | |
| 4,073,516 A | 2/1978 | Kling | |
| 4,146,371 A | 3/1979 | Melcher et al. | |
| 4,146,800 A | 3/1979 | Gregory et al. | |
| 4,204,844 A | 5/1980 | Pilat | |
| 4,206,396 A * | 6/1980 | Marks | H02N 3/00 290/44 |
| 4,271,357 A | 6/1981 | Bradshaw et al. | |
| 4,285,481 A * | 8/1981 | Biscomb | B64B 1/50 244/153 R |
| 4,328,436 A | 5/1982 | Biblarz et al. | |
| 4,395,648 A | 7/1983 | Marks | |
| 4,417,293 A | 11/1983 | Larigaldie | |
| 4,433,248 A | 2/1984 | Marks | |
| 4,450,364 A | 5/1984 | Benoit | |
| 4,486,669 A * | 12/1984 | Pugh | B64B 1/50 244/154 |
| 4,523,112 A | 6/1985 | Marks | |
| 4,581,675 A | 4/1986 | Kelly | |
| 4,667,100 A | 5/1987 | Lagna | |
| 5,047,892 A | 9/1991 | Sakata et al. | |
| 5,125,230 A | 6/1992 | Leonard | |
| 5,214,386 A | 5/1993 | Singer et al. | |
| 5,247,842 A | 9/1993 | Kaufman et al. | |
| 5,273,838 A | 12/1993 | Draper et al. | |
| 5,332,154 A | 7/1994 | Maier et al. | |
| 5,677,718 A | 10/1997 | Crawford et al. | |
| 5,912,396 A | 6/1999 | Wong | |
| 6,254,034 B1 | 7/2001 | Carpenter | |
| 6,302,331 B1 | 10/2001 | Dvorsky et al. | |
| 6,440,600 B1 | 8/2002 | Starzak | |
| 6,452,499 B1 | 9/2002 | Runge et al. | |
| 6,462,337 B1 | 10/2002 | Li et al. | |
| 6,504,702 B1 | 1/2003 | Noll | |
| 6,544,484 B1 | 4/2003 | Kaufman et al. | |
| 7,007,710 B2 | 3/2006 | Heller et al. | |
| 7,105,940 B2 * | 9/2006 | Weesner | F03D 1/003 290/44 |
| 7,257,946 B2 | 8/2007 | Welch | |
| 7,405,672 B2 | 7/2008 | Taylor et al. | |
| 7,478,712 B2 | 1/2009 | Mccowen | |
| 7,748,343 B2 * | 7/2010 | Kim | B05B 5/0255 118/621 |
| 7,776,266 B2 | 8/2010 | Royds | |
| 7,855,476 B2 | 12/2010 | Ogram | |
| 8,102,082 B2 | 1/2012 | Ogram | |
| 8,283,811 B2 | 10/2012 | Ogram | |
| 8,502,507 B1 * | 8/2013 | White | H02N 3/00 290/54 |
| 9,038,920 B2 | 5/2015 | Kalra et al. | |
| 9,413,274 B2 * | 8/2016 | Stahl | H02N 3/00 |
| 2002/0050719 A1 | 5/2002 | Caddell et al. | |
| 2002/0060631 A1 | 5/2002 | Runge et al. | |
| 2002/0153006 A1 | 10/2002 | Zimlich et al. | |
| 2002/0158196 A1 | 10/2002 | Berggren et al. | |
| 2003/0186458 A1 | 10/2003 | DiCesare et al. | |
| 2003/0218855 A1 | 11/2003 | Goldenberg | |
| 2004/0036019 A1 | 2/2004 | Goodley et al. | |
| 2004/0089156 A1 | 5/2004 | Gartstein et al. | |
| 2004/0129931 A1 | 7/2004 | Asryan et al. | |
| 2004/0134997 A1 | 7/2004 | Khain et al. | |
| 2004/0164241 A1 | 8/2004 | Farnsworth et al. | |
| 2004/0179322 A1 | 9/2004 | Pletcher et al. | |
| 2006/0061107 A1 | 3/2006 | Cadaret | |
| 2007/0114381 A1 | 5/2007 | Jackson | |
| 2007/0216316 A1 | 9/2007 | Hirano et al. | |
| 2008/0063577 A1 | 3/2008 | Crowe et al. | |
| 2008/0073530 A1 | 3/2008 | Jolliffe et al. | |
| 2008/0131615 A1 | 6/2008 | Robertson et al. | |
| 2008/0199195 A1 | 8/2008 | Swift et al. | |
| 2008/0308095 A1 | 12/2008 | Trees et al. | |
| 2008/0309087 A1 | 12/2008 | Evulet et al. | |
| 2009/0218910 A1 | 9/2009 | Carmein et al. | |
| 2009/0314850 A1 | 12/2009 | Kampmeyer | |
| 2010/0018850 A1 | 1/2010 | Adhvaryu et al. | |
| 2010/0127624 A1 | 5/2010 | Roy | |
| 2010/0156444 A1 | 6/2010 | Ponjee et al. | |
| 2011/0050080 A1 | 3/2011 | Suzuki et al. | |
| 2012/0000627 A1 | 1/2012 | Jewell-Larsen et al. | |
| 2012/0187682 A1 | 7/2012 | Carmein et al. | |
| 2012/0211989 A1 | 8/2012 | Carmein et al. | |
| 2012/0304637 A1 | 12/2012 | Allen et al. | |
| 2013/0008315 A1 | 1/2013 | White et al. | |
| 2013/0015257 A1 | 1/2013 | Kalra et al. | |
| 2013/0285379 A1 | 10/2013 | Seeley et al. | |
| 2013/0313942 A1 | 11/2013 | White et al. | |
| 2014/0110494 A1 | 4/2014 | Mills et al. | |
| 2014/0292140 A1 | 10/2014 | Carmein et al. | |

FOREIGN PATENT DOCUMENTS

| | | | |
|---|---|---|---|
| DE | 639000 | 11/1936 | |
| DE | 19629417 A | 2/1998 | |
| DE | 10360876 * | 9/2005 | H02N 3/00 |
| DE | 10360876 A | 9/2005 | |
| GB | 0909232 | 7/2009 | |
| WO | 2006082357 A1 | 8/2006 | |
| WO | 2009094441 * | 1/2009 | H02N 3/00 |
| WO | 2009094441 A | 7/2009 | |
| WO | 2010127178 A | 11/2010 | |

OTHER PUBLICATIONS

D. Djairam "The Electrostatic Wind Energy Converter, Electrical Performance of a High Voltage Prototype", pp. 1-173. Doctoral Dissertation, Dec. 10, 2008. http://repository.tudelft.nl/view/ir/uuid:e1cfdada-85ea-45c4-b6e4-b798abf5917 e/.

(56) References Cited

OTHER PUBLICATIONS

D. Djairam et al. "The Development of an Electrostatic Wind Energy Converter (EWICON)" 2005 International Conference on Future Power Systems High Voltage Technol. & Manage. Group, Delft Univ. of Technol. Dec. 2005; DOI: 10.1109/FPS.2005.204208 ISBN: 90-78205-02-4.

* cited by examiner

ELECTRO-HYDRODYNAMIC SYSTEM

CROSS-REFERENCE TO RELATED APPLICATIONS

This application is a continuation of patent application Ser. No. 13/632,974, filed 1 Oct. 2012, now issued as U.S. Pat. No. 8,502,507, which claims priority to prior application No. 61/617,632, filed 29 Mar. 2012. This application is a continuation-in-part of patent application Ser. No. 13/932,957, filed 1 Jul. 2013, now issued as U.S. Pat. No. 8,878,150, which is a continuation of patent application Ser. No. 13/333,797, filed 21 Dec. 2011, now issued as U.S. Pat. No. 8,502,181, which is a continuation of patent application Ser. No. 12/357,862, filed 22 Jan. 2009, now issued as U.S. Pat. No. 8,421,047, which claims priority to prior application No. 61/011,701, filed 22 Jan. 2008, prior application No. 61/066,650, filed 22 Feb. 2008 and prior patent application No. 61/199,585, filed 18 Nov. 2008.

This application is related to prior application Ser. No. 12/357,862, filed 22 Jan. 2009, prior PCT application number PCT/US09/31682, filed 22 Jan. 2009, and prior application Ser. No. 13/276,055, filed 18 Oct. 2011, which are incorporated in their entirety by this reference.

TECHNICAL FIELD

This invention relates generally to the electro-hydrodynamic energy harvesting field, and more specifically to a new and useful system and method for increasing harvesting efficiencies in the electro-hydrodynamic energy harvesting field.

BACKGROUND

Figure 1:
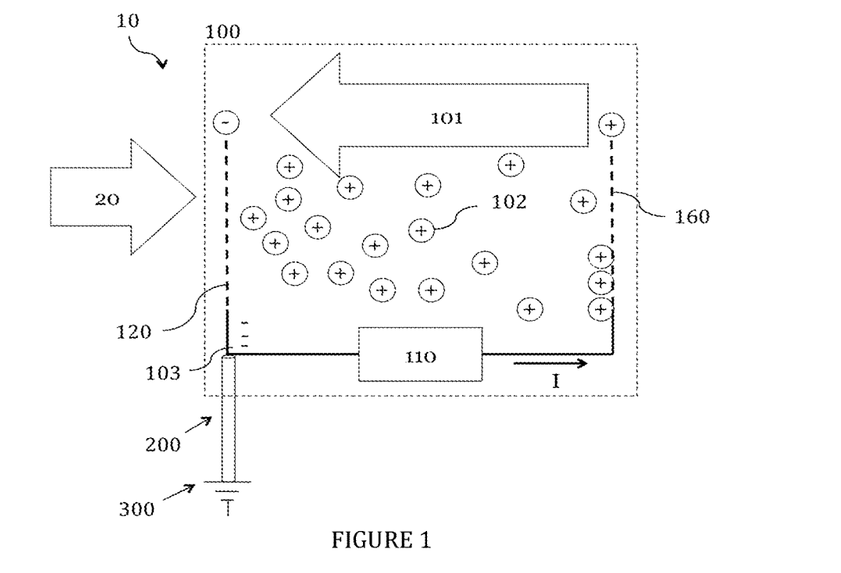
FIG. 1 is a schematic representation of the electro-hydrodynamic (EHD) system.

Electro-hydrodynamic ("EHD") energy conversion is a process wherein electrical energy is extracted from the kinetic energy of a flowing fluid, such as a wind stream. As illustrated in FIG. 1, and described in detail in U.S. application Ser. No. 12/357,862 and PCT application PCT/US09/31682, an EHD wind system emits a fine mist of charged particles of a single polarity into a wind stream, wherein the wind stream separates the charges from the oppositely charged source. As wind drag moves charged particles from a charge source (isolated from electrical ground) to a downstream collector (coupled to electrical ground), charge source becomes charged to an electric potential (system voltage/system potential). When the charged particles are positive, the system potential is negative with respect to ground, and vice versa. In prior art EHD systems, charging of the system is self-limiting. As the system charges to ever higher system voltages, the drag force of the wind must overcome a larger back force from the electric field (system field), generated by the system potential, that is directed from electrical ground to the charge source. Additionally, the distribution of charged particles between the charge source and the downstream collector, also known as a space charge, creates a second electric field that further hinders charged particle movement by the wind. When the drag force of the wind and the sum of the fields created by the system potential and the space charge are in equilibrium, the EHD system reaches a steady state. In steady state, the system no longer charges to a large system potential (in magnitude), which results in a drop in extracted power. Unfortunately, the system potential cannot simply be increased to extract more power—an increase system potential above a steady state condition typically results in a reduction in the current running from the charge source to ground. This is because some of the current will be deflected to a conductor of the EHD system as the large system field shorts the charged particles to the conductor. Thus, the extracted power will not increase.

This invention provides a new and useful system and method of controlling the field magnitude at the charging source.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

As shown in FIG. 1, the electro-hydrodynamic (EHD) system 10 includes an energy harvester 100 and a distance element 200 that positions a component of the energy harvester 100 relative to electrical ground 300. The energy harvester 100 is preferably includes a charge source 120, and can additionally include a field shaper 140, downstream collector 160, or any other suitable component. This EHD system 10 functions to maximize the power that can be continuously extracted from a wind stream 20 for given wind conditions by controlling the magnitude of the system field 110. As previously described, it is often desirable to run EHD systems 10 at high voltages, but such high voltages generate large system fields 110, which can result in system losses through, for example, shorting.

Figure 10:
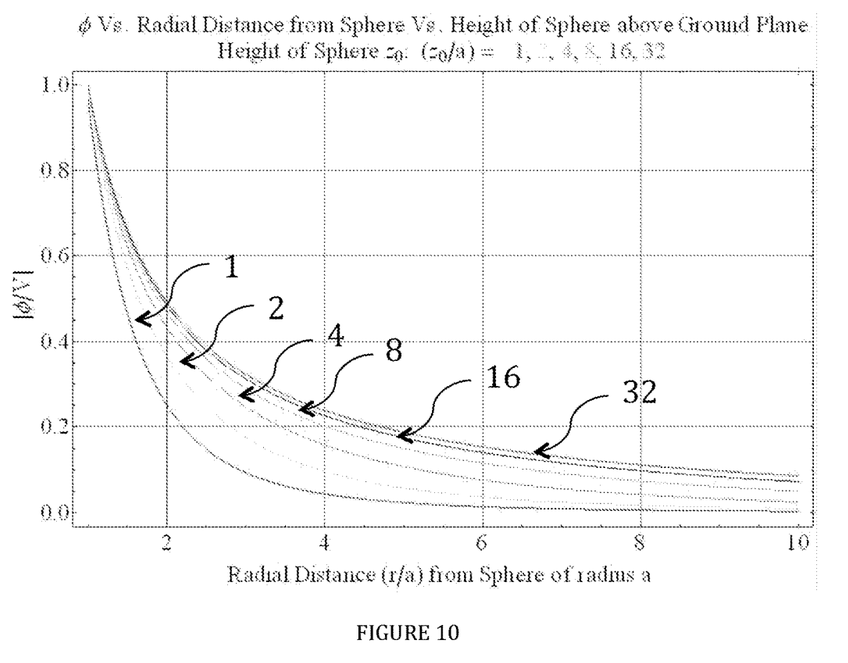
FIG. 10 is a plot depicting the electric potentials for an example EHD system along a radial line, extending from the system horizontal to the ground, for different ratios of system distance from the ground plane ($z_o$) to system characteristic radius (a).
Figure 11:
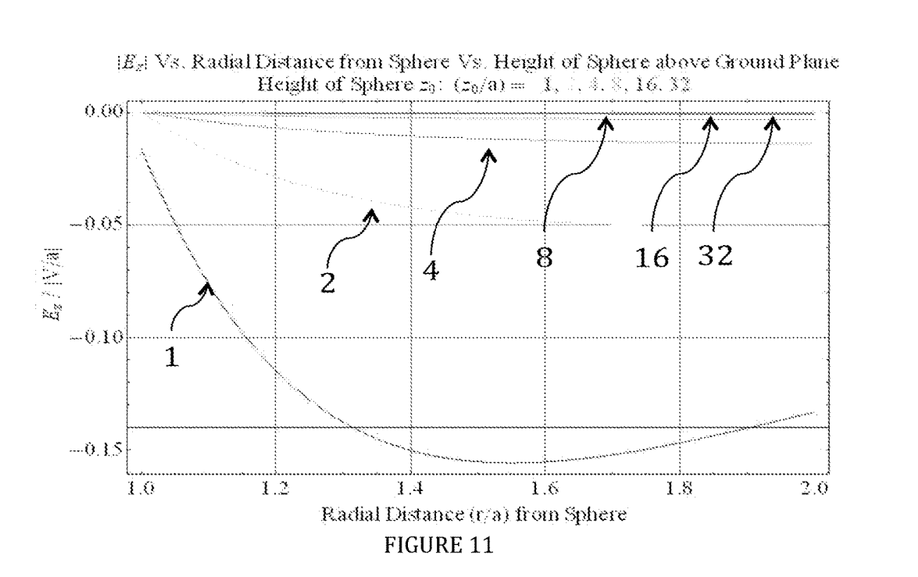
FIG. 11 is a plot of the z-components (vertical) of the system field for an example EHD system along a radial line, extending from the system horizontal to the ground, for different ratios of system distance from the ground plane ($z_o$) to system characteristic radius (a).

By decreasing the strength of the system field 110 proximal the energy harvester 100, more specifically, proximal the charged components of the energy harvester 100, operation of EHD systems 10 at higher system potentials than prior art systems (as shown in FIGS. 10 and 11) can be possible. Controlling the strengths of the system field 110 and/or space charge field can confer the benefits of reducing shorting and increasing the ground current, which, in turn, results in increased power output, as power output is a product of the system voltage (preferably held constant) and the ground 320 current (increased).

Figure 2:
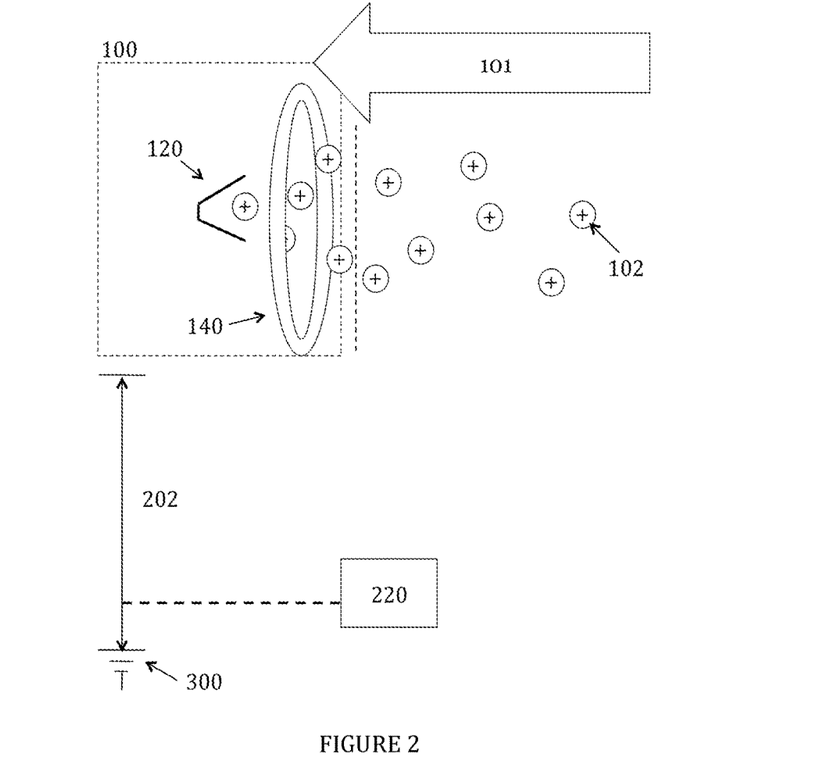
FIG. 2 is a schematic representation of the problem, as discovered by the inventors.

As the inventors have discovered, two characteristics of the system field 110 can be leveraged to control the strength of the system field 110 proximal the energy harvester 100. The magnitude of the system field 110 at surfaces of the various conductors of the system (charged components) is dependent on: a) the voltage difference between the charged component and electrical ground 300 (system potential), and b) the distance between the charged component and electrical ground 300 (as shown in FIG. 2). In one specific variation, the distance between the charged component and electrical ground is maintained at a distance of approximately eight times the characteristic dimension of the charged component. In conventional EHD systems, the charged components are either maintained at distances far larger than this distance (e.g. kite systems) to harvest high altitude, high velocity wind streams, or maintained at distances far shorter than this distance (e.g. building or ground mounted systems) for ease of maintenance and/or aesthetic purposes. Maintaining the charged component at eight times the characteristic distance has the unexpected result of increasing the power output through system and space charge field control.

By controlling the distance between the energy harvester 100 and electrical ground 300, this EHD system 10 can facilitate more continuous energy extraction from the wind by changing the magnitude of the system field 110 near the energy harvester 100 to accommodate for system parameter changes. Such parameter changes include changes in the system field 110 (e.g. an increase in field magnitude as the charged particles 102 aggregate at the downstream collector 160), changes in the wind (e.g. a decrease or increase in wind velocity, changes in wind direction), changes in the environment (e.g. changes in temperature, humidity, etc.), or changes in any other suitable system parameter. Furthermore, as previously described, this EHD system 10 can allow for increased power extraction from the wind.

The energy harvester 100 preferably includes a charge source 120, which functions to emit and/or generate charged particles 102. The charged particles 102 emitted by the charge source 120 are preferably of a single polarity, wherein charges of the opposite polarity 103 are preferably retained by the charge source 120. In one variation, the charged particles 102 are positively charged, while the negative charges remain with the charge source 120. In another variation, the charged particles 102 are negative charges. The charged particles 102 are preferably liquid droplets, more preferably water droplets, but can be water droplets with additives (e.g. saline, surfactants, etc.), solid particulates (e.g. dust, fertilizer, etc.), air molecules, or ambient potential charge carriers (e.g. water vapor clusters, pollen, smog, industrial exhausts).

The charge source 120 is preferably one of those described in U.S. application Ser. No. 12/357,862 or PCT application PCT/US09/31682. The charge source 120 preferably includes an injector configured to emit a particle into a wind stream, and an electrode configured to charge the emitted particle to a first polarity and to generate a first electric field. However, the charge source 120 can be any suitable source of charged particles 102.

In one variation of the EHD system 10, the charge source 120 includes one or more point sources. In alternative of the EHD system 10, the point source includes an arrangement of electrospray injectors. In another alternative of the EHD system 10, the point source includes a plurality of charging electrodes, each coupled to a spray nozzle, wherein the spray nozzle can be a plain orifice nozzle, swirl nozzle, compound nozzle, two-fluid nozzle, or any other suitable nozzle. The charging electrode can be a ring electrode concentric with the nozzle, a rail electrode proximal the nozzle (e.g. above, below, up or downstream from the nozzle), a bar electrode proximal the nozzle (e.g. upstream from the nozzle) or any other suitable charging electrode. In a third alternative of the EHD system 10, the point source is a MEMS-based inkjet and electrospray combination.

In a second variation of the EHD system 10, the charge source 120 includes a reservoir of charging fluid and an electrode disposed above the reservoir, wherein the electrode charges and pulls water droplets from the reservoir surface. In a third variation, the charge source 120 is a corona discharge device. In a fourth variation, the charge source 120 is a dielectric discharge device. However, any other suitable charge source 120 can be utilized.

The energy harvester 100 can additionally include a downstream collector 160, which functions to collect the charged particles 102 released by the charge source 120. The downstream collector 160 preferably has the same polarity of the charged particles 102, and preferably has a charge opposite that of the charge source 120. The downstream collector 160 can be a component of the EHD system 10, or can be the ground 320. When the downstream collector 160 is a component, the downstream collector 160 is preferably conductive. Examples of component downstream collector 160s include a grid, a mesh, a wire, and a plate, but any other suitable downstream collector 160 can be used.

The energy harvester 100 can additionally include a field shaper 140, which controls the electric field in the substantially immediate downwind vicinity of the charge source 120. The field shaper 140 is preferably the system disclosed in prior application Ser. No. 13/276,055, filed 18 Oct. 2011 and titled "System And Method For Controlling Electric Fields In Electro-Hydrodynamic Applications," incorporated herein in its entirety by this reference, but can alternatively be any suitable field shaper 140. The field shaper 140 is preferably an electric field generator that generates a third electric field in the immediate downwind vicinity of the charge source 120. This third field preferably opposes the system field 110, which tends to concentrate at the charge source 120. By applying an opposing third field near the charge source 120, the field shaper 140 can reduce or substantially eliminated the effects of the space charge. The field shaper 140 can be held at a potential substantially similar or equal to the system potential, or can be held at a different potential. The field shaper 140 is preferably a structural component of the EHD system 10, and more preferably functions as the support structure, but can alternatively be a separate component. The EHD system 10 preferably includes a field shaper 140 located proximal the charge source 120, but can alternatively/additionally include a field shaper 140 located proximal the downstream collector 160 or proximal any other suitable charged EHD system 10 component. However, the field shaper 140 can be any suitable system or electrode that manages the magnitude of the system field 110.

In one variation of the system, the field shaper 140 includes a circumscribing, inductive ring with an open space defined within the center, wherein the charge source 120 is preferably located within the defined space. The circumscribing structure is preferably circular and/or toroidal, but can alternatively be a rectangular prism, polygonal prism (e.g. pentagonal, hexagonal, etc.), cylindrical, ovoid, or have any other suitable geometry.

In a second variation of the system, the field shaper 140 includes an attracting electrode and a shielding electrode of opposite polarities. The attracting electrode preferably attracts the charged particles 102 towards the field shaper 140, while the shielding electrode repel the charged particles 102 and prevent the charged particles 102 from shorting to the attracting electrode. In this variation, the adjustment element can control the distance between the attracting and shielding electrodes, the distance between electrode pairs, the height of the electrode pair relative to electrical ground 300 (e.g. by controlling the height of the electrode pair relative to ground 320 or by controlling the relative position of a grounded electrode to the electrode pair), control the potentials of the electrodes or control any other suitable field shaper 140 parameter.

Alternatively, any other suitable field shaper 140 can be utilized.

Figure 9:
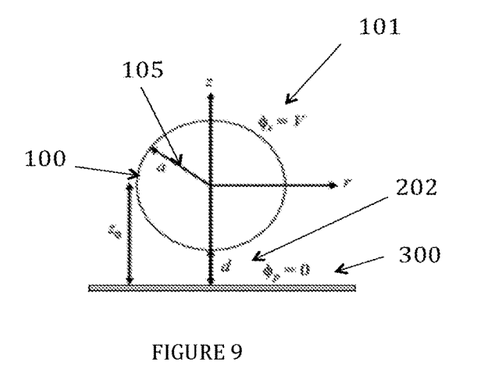
FIG. 9 is a schematic representation of the characteristic dimension of an EHD system.

The distance element 200 of the EHD system 10 functions to control the relative positioning between the energy harvester 100 of the EHD system 10 and electrical ground 300. The distance element 200 can be a fixed element, an adjustment element, or any other suitable element that controls the distance between the energy harvester 100 and electrical ground 300. As shown in FIG. 9, the adjusted or maintained distance between the energy harvester 100 and electrical ground 300 ($z_o$) is preferably based on the characteristic dimension 105 of the system. The characteristic dimension 105 is preferably the largest dimension of the system, more preferably the largest dimension of a charged component of the energy harvester 100, or the largest dimension of an electric-field generating component of the system. Charged components of the energy harvester 100 can include the charge source 120, the electrode of the charge source 120, the field shaper 140, the downstream collector 160, and/or any other suitable component of the energy harvester 100 that is charged. Electric field-generating components of the system include at least the electrode of the charge source 120, the field shaper 140, and/or the downstream collector 160, but can additionally/alternatively include any suitable electric field-generating component. In some variants of the system, the characteristic dimension 105 can be the length (e.g. diameter or major axis) of the field shaper 140 or the electrode of the charge source 120. However, the characteristic dimension 105 can be any suitable dimension of the EHD system 10.

The distance between the energy harvester 100 and electrical ground 300 is preferably maintained at or adjusted to an equilibrium distance 202, but can alternatively be maintained at or adjusted to a distance 202 that is longer or shorter than the equilibrium distance 202. The equilibrium distance 202 is preferably at least eight times the characteristic dimension 105, but the EHD system 10 can be maintained at or adjusted to a distance 202 at least four times, ten times, sixteen times, or any suitable ratio of the characteristic dimension 105. For example, as shown in FIG. 11, when the distance 202 is more than eight to ten times the field shaper 140 diameter/width, the strength of the system field 110 can be reduced to a minimum at the surface of the field shaper 140. Alternatively, the distance element 200 can adjust the relative positioning to any suitable distance 202, dependent on the system and environmental parameters. The distance element 200 preferably controls the relative positioning of the charged component that has the characteristic diameter, but can control the relative positioning of the energy harvester 100 as a whole, control the relative positioning of another charged component, or control the relative positioning of at least one component of the energy harvester 100 in any suitable manner.

In one variation of the EHD system 10, the distance element 200 is a fixed element that statically positions the energy harvester 100 of the EHD system 10 relative to electrical ground 300. The fixed element preferably positions the entire energy harvester 100 relative to electrical ground 300, but can alternatively only maintain the position of one or several components of the energy harvester 100. In one variation, the fixed element preferably maintains the distance between the energy harvester 100 and electrical ground 300 to at least the equilibrium distance 202 (e.g. eight to ten times the diameter/width of the largest charged component). For example, if a circumscribing field shaper 140 is used, then the distance 202 is preferably maintained at a distance 202 of at least eight times the diameter/width of the field shaper 140. In another example, if only a charge source 120 is used, then the distance 202 is preferably maintained at a distance 202 of at least eight times the length of the charge source 120, more preferably the electrode of the charge source 120. In another example, if a downstream collector 160 is used, the distance 202 is preferably maintained at a distance 202 of at least eight times the diameter of the largest diameter field-shaping feature of the downwind collector.

The fixed element is preferably a support structure, wherein the support structure height is preferably fixed. The fixed element can be a pole, mounting bracket, frame, or any other suitable support structure. The energy harvester 100 is preferably supported by the support structure, wherein the energy harvester 100 is coupled to the end of the support structure distal from the mounting surface 320 (e.g. ground 320). Alternatively, the energy harvester 100 can be suspended from the support structure, or be otherwise coupled to the support structure. The fixed element is preferably made of cylindrical elements, but can alternatively have other geometries. Portions of the fixed element that face the system field 110 are preferably curved to prevent corona discharge. Alternatively, the fixed element can be a fixed length of tether, wherein the energy harvester 100 is located on a tethered aircraft (e.g. kite). The fixed element can also be an aircraft cruising at a given altitude, wherein the energy harvester 100 is located on the aircraft. When the energy harvester 100 is suspended from a lifting device (aircraft, balloon, etc.) the air between the energy harvester 100 and the ground 320 can also be considered as the distance element 200. However, any suitable element that maintains a substantially constant distance between the energy harvester 100 and the electrical ground 300 can be used.

In another variation of the EHD system 10, the distance element 200 is an adjustment element that adjusts the positioning between the energy harvester 100 and electrical ground 300, which can control the system field magnitude. The adjustment element preferably adjusts the entire energy harvester 100, but can alternatively adjust different components of the energy harvester 100 independently, or adjust the positioning of the energy harvester 100 components in any suitable manner. In one variation of the EHD system 10, to increase the field magnitude, the adjustment element preferably decreases the distance between the energy harvester 100 and the electrical ground 300. To decrease the field magnitude, the adjustment element preferably increases the distance between the energy harvester 100 and electrical ground 300. However, the distance 202 can be adjusted in any suitable manner to control the system field magnitude at the energy harvester 100.

The adjustment element preferably adjusts the distance between the energy harvester 100 and electrical ground 300 until a performance threshold is reached (e.g. power threshold, current threshold, etc.). However, the adjustment element can be adjusted to maintain the distance 202 at an equilibrium position. In this variation, the adjustment element adjusts the distance 202 when an adjustment condition is met, and gradually regains the equilibrium position as the system parameters change or are adjusted. The distance 202 is preferably maintained at the equilibrium position while a performance parameter remains within the threshold or within a given range, and is preferably adjusted when an adjustment condition is met, such as when the parameter exceeds the given threshold or range. The equilibrium position is preferably wholly or partially determined from the combined effects on the system field magnitude of the charged components of the energy harvester 100 (e.g. field shaper 140) and the energy harvester 100 distance 202 from electrical ground 300. For example, the equilibrium position can be determined from the diameter/width of the field shaper 140, wherein the equilibrium position is preferably at least eight times the diameter/width of the field shaper 140. However, the equilibrium position can be selected from a chart based on current environmental/system parameters, or otherwise determined.

The adjustment element is preferably electrically nonconductive, and can be made of electrically nonconductive material (e.g. polymeric, ceramic materials), or can be electrically insulated (e.g. by rubber, polymeric coating, ceramic coating, etc.). A controller or electric control unit (ECU) preferably controls adjustment of the adjustment element. More preferably, the adjustment element is controlled by the ECU that controls the rest of the EHD system 10. Alternatively, the adjustment element can be passively controlled. The adjustment element is preferably driven by a drive mechanism 220 which can be actively controlled by the ECU or passively controlled. The drive mechanism 220 can include a motor, pneumatics, a pump, a turbine, a winch (hand operated or electric), or any other suitable drive mechanism 220. In the variation wherein the drive mechanism 220 is a turbine, the wind from which the EHD system 10 is harvesting energy also preferably drives the turbine (e.g. passive control). The turbine can include a conversion system, preferably including a series of gears, that are configured to adjust the distance between the energy harvester 100 and electrical ground 300 dependent on the turbine rotation frequency (e.g. the distance 202 increases as wind speed decreases and vice versa). Alternatively, the turbine can be a water turbine, wherein adjustment element adjustment is preferably controlled by the ECU.

Electrical ground 300 is preferably the ground 320 (e.g. Earth), but can alternatively be a mounting surface 320, such as a building or other grounded structure. The adjustment element can additionally include a grounding element 340, such as a conductive wire, plate, enclosure, or any other suitable grounding element 340, wherein the grounding element 340 is coupled to the ground 320.

In one variation of the EHD system 10, the adjustment element is an adjustable member 210 that adjusts the position of the energy harvester 100 relative to a substantially stationary electrical ground 300. In this version, the electrical ground 300 is preferably the ground 320 (e.g. Earth) or a grounded mounting surface 320, but can alternatively be a grounding element 340 that is statically fixed relative to the mounting surface 320. In this version, the adjustable member 210 is preferably the support structure that supports the energy harvester 100, wherein the support structure mounts the energy harvester 100 to the ground/mounting surface 320.

Figure 3:
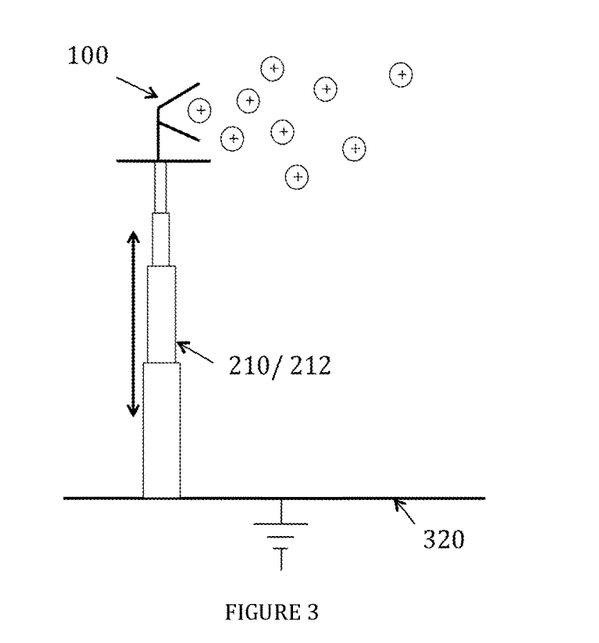
FIGS. 3-8 is a schematic representation of a first, second, third, fourth, fifth, and sixth example of the EHD system, respectively.
Figure 4:
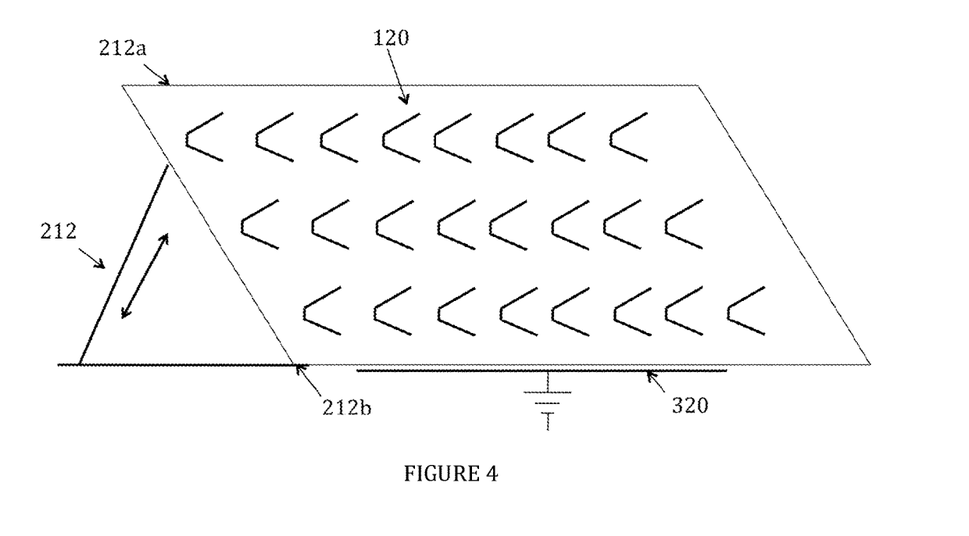

In a first alternative of the first variation of the EHD system 10, an example of which is shown in FIG. 3, the adjustable member 210 includes a telescoping support 212, including multiple nesting structures, that extends from a mounting surface 320. The energy harvester 100 is preferably coupled to the end of the pole distal from the mounting surface 320. The length of the pole (and thus, the distance between the energy harvester 100 and electrical ground 300) is preferably controlled by the ECU, wherein the ECU sends control signals to the drive mechanism 220 that controls the pole length. Pole extension and/or retraction is preferably controlled by pneumatics, but can alternatively be controlled by a motor (e.g. coupled to a wire/wire rope, such that the motor functions as a winch) or any suitable drive mechanism 220. The pole is preferably cylindrical, but can alternatively be rectangular or have any other suitable cross-section. In the latter cases, the side of the pole facing the system field 110 is preferably radiused to prevent corona discharge at an edge. The pole is preferably a single pole, but can alternatively be a tripod or any other suitable configuration. Alternatively, as shown in FIG. 4, the pole can be a component of a mounting bracket, wherein the mounting bracket further includes a mounting face 212a configured to couple to one or more charge source arrays and a hinge 212b. A change in pole length preferably rotates the mounting face about the hinge, changing the angle and height of the coupled charge sources 120. The coupled charge source arrays can be held at different relative voltages, or can be held at the same voltage.

Figure 5:
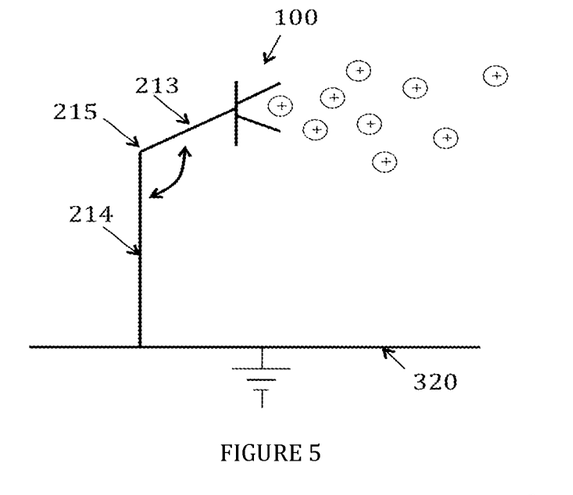

In a second alternative, as shown in FIG. 5, the adjustable member 210 includes an arm 213, a pole 214, and a joint 215 coupling the arm to the pole. The charge source 120 is preferably coupled to the end of the arm distal from the joint. The pole end distal from the joint is preferably mounted to the ground 320 or another mounting surface 320. The arm 213 and pole 214 preferably both have fixed lengths, but can alternatively have adjustable lengths (e.g. telescoping). The arm 213 and pole 214 are preferably cylindrical, but can alternatively be rectangular or have any other suitable cross-section. In the latter cases, the side of the arm or pole facing the system field 110 is preferably radiused to prevent corona discharge at an edge. The joint 215 is preferably a hinge, but can alternatively be a universal joint or any other suitable joint. A drive mechanism 220 preferably rotates the arm about the joint, increasing or decreasing the energy harvester distance 202 from electrical ground 300. Arm movement about the joint is preferably driven by a motor, but can alternatively be passively driven (e.g. by a pulley system coupled to a turbine, etc.).

Figure 6:
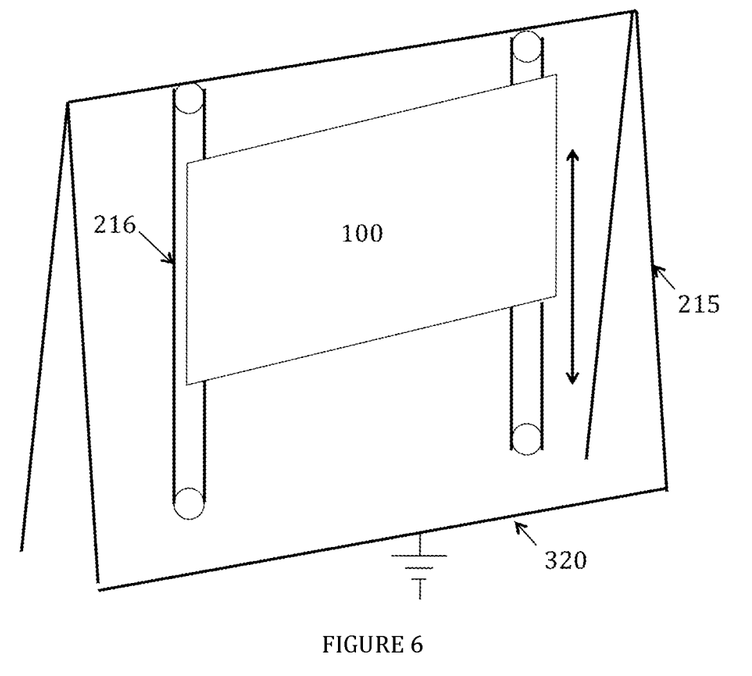

In a third alternative, the adjustable member 210 includes a frame 215 and an adjustable suspension mechanism 216, wherein the energy harvester 100 is suspended by the suspension mechanism 216 from the frame 215. The suspension mechanism 216 preferably includes one or more wires coupled to one or more pulley systems, wherein an end of the wires is preferably coupled to the charge source 120. The wires are preferably coupled to an energy harvester edge distal from electrical ground 300, but can additionally be coupled to the energy harvester edge proximal from electrical ground 300 (as shown in FIG. 6). In the latter case, the wire is preferably in tension to prevent substantial horizontal movement of the EHD system 10 during operation.

In a fourth alternative, the adjustable member 210 includes a winch coupled to a tether. This alternative is preferably used if the energy harvester 100 is located on a tethered aircraft (e.g. airplane, kite, etc.). The winch is preferably actively driven by a motor, but can alternatively be passively driven by a turbine, manually driven, or driven by any other suitable means.

However, any other suitable means and/or methods of moving the charge source 120 relative to a stationary electrical ground 300 can be used.

In a second variation of the EHD system 10, the adjustment element is preferably the lift-producing mechanism of an aircraft, wherein the energy harvester 100 is located on the aircraft. The adjustment element preferably adjusts the aircraft altitude to control the system field magnitude; for example, the adjustment element can increase the aircraft elevation to decrease the system field magnitude. The adjustment element can be the heating element of a hot air balloon, the jets or turbines of a plane, the wing flaps of a plane (e.g. wherein the height is controlled by the flap angle), or any other suitable element that influences lift on an aircraft. In this version, the adjustment element can be controlled by the controller (e.g. ECU) of the aircraft.

Figure 7:
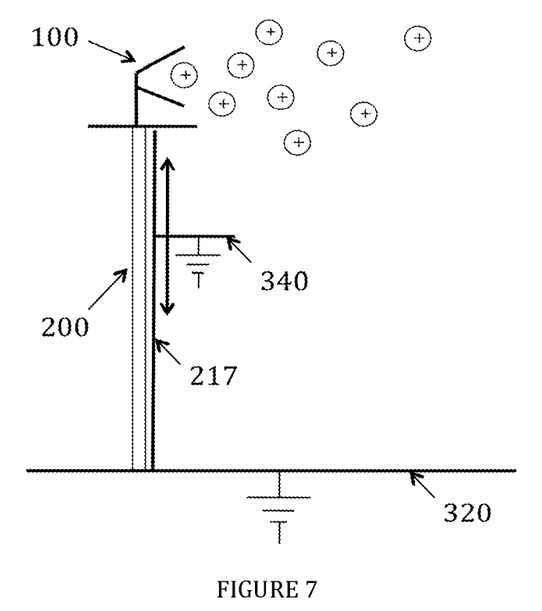
Figure 8:
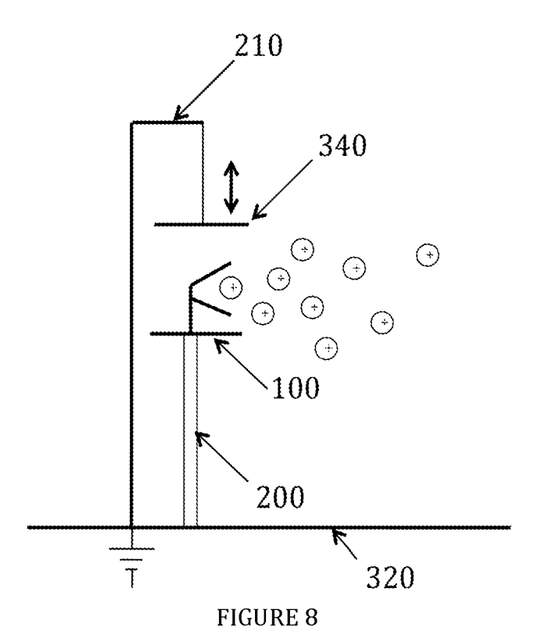

Alternatively, the adjustment element can adjust the position of the electrical ground 300 relative to an energy harvester 100 that is held substantially stationary relative to the ground 320 or mounting surface 320. In this variant, electrical ground 300 is preferably a grounding element 340, such as a wire or plate, which is electrically coupled to the ground 320 (e.g. by a wire). The grounding element 340 is preferably located below the charge source 120 (e.g. between the charge source 120 and the ground 320) as shown in FIG. 7, but can alternatively be located above the charge source 120 (e.g. hung above the charge source 120) as shown in FIG. 8. The adjustment element preferably includes an adjustable member 210 that positions the grounding element 340 relative to the charge source 120. The adjustable member 210 preferably includes grounding element guides 217 that run along the charge source 120 support structure, but can alternatively be a winch or pulley system, a telescoping system, or any other suitable positioning mechanism. The adjustable member 210 is preferably electrically insulated and/or non-conductive, but can include grounding contacts through which the grounding element 340 can electrically couple to the ground 320.

Alternatively, the adjustment element can control the height of the downstream collector 160. In this version, the downstream collector 160 is preferably a mesh, grid, wire, or any other suitable downstream collection element. The adjustment element is preferably substantially similar to those described above, and can either adjust the height of the downstream collector 160 relative to a mounting surface 320, or adjust the proximity of a grounding element 340 to the downstream collector 160. Alternatively, the adjustment element can be any suitable element that can adjust the distance between the downstream collector 160 and electrical ground 300. The adjustment element preferably positions the downstream collector 160 a distance 202 of at least eight times the largest dimension (e.g. diameter/width) of the downstream collector 160 or associated field shaper 140 away from electrical ground 300, but can alternatively position the downstream collector 160 closer or further away.

Alternatively, the adjustment element can adjust the position of the field shaper 140 relative to electrical ground 300. In this alternative, the adjustment element is preferably similar to those described above, and can either adjust the proximity of the field shaper 140 to a mounting surface 320, or adjust the proximity of a grounding element 340 to the field shaper 140. Alternatively, the adjustment element can be any suitable element that can adjust the distance between the field shaper 140 and electrical ground 300. The distance between electrical ground 300 and the field shaper 140 is preferably a multiple of the largest dimension of the field shaper 140 (e.g. the diameter/width), more preferably eight to ten times the largest field shaper 140 dimension. However, the distance 202 can alternatively be larger or smaller.

The EHD system 10 can additionally include field elements, which can be used to fine-tune the system field magnitude.

In one variation of the EHD system 10, the field element adjusts the diameter or width of the field shaper 140. The field element is preferably the field shaper itself, wherein the field shaper 140 can be extended to achieve a larger diameter or contracted to achieve a smaller diameter, similar to a telescoping pole. The field shaper 140 preferably includes nesting components, but can alternatively include any suitable mechanism that allows for field shaper geometry change.

The field element can alternatively adjust the field shaper distance 202 from the charge source 120 to adjust the effect of the field shaper field on the system field 110 proximal the charge source 120. In this alternative, the adjustment element controls the field shaper position downwind from the charge source 120.

Alternatively, the field element can control the angle of the field shaper 140 relative to the charge source 120, control the magnitude of the reversing field, or control any other suitable parameter of the field shaper 140.

The EHD system 10 is preferably a modular system, such that the EHD system 10 can be easily aggregated into various total sizes. Each component of the EHD system 10 is preferably independent of the form of the other components. For example, one variation of the energy harvester 100 preferably can be utilized with multiple variations of the adjustment element; one variation of the adjustment element preferably can be utilized with multiple variations of the charge source 120; one variation of the adjustment element preferably can be used with both the energy harvester 100 or the downstream collector 160; or one variation of the adjustment element preferably can be utilized with multiple variations of the field shaper 140. However, variants of any component of the EHD system 10 are preferably compatible with some or all of the variants of other EHD system 10 components. Alternatively, the EHD system 10 can be manufactured and assembled as a standard module, wherein the module includes a charge source variant and a distance element variant. For example, the module can include an energy harvester 100, including one row of spray nozzles coupled to one rail electrode, supported on a telescoping pole, wherein multiple modules are coupled together to form the EHD system 10. However, the EHD system 10 can be manufactured and assembled as a non-modular system.

2. Method.

Figure 12:
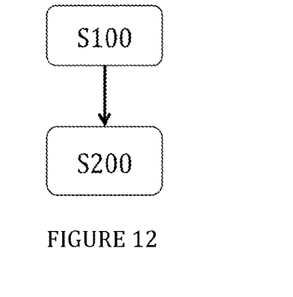
FIG. 12 is a schematic representation of a method of EHD system operation.
Figure 13:
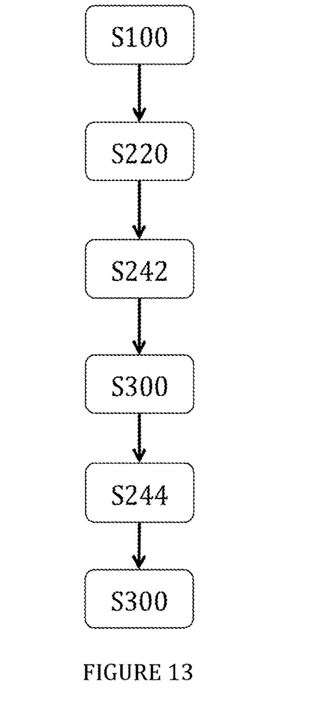
FIG. 13 is a schematic representation of an example method of EHD system operation.

As shown in FIG. 12, the method of operating the EHD system includes: monitoring a parameter indicative of the system field magnitude proximal the energy harvester S100; and adjusting the distance between at least one component of the energy harvester and electrical ground in response to an adjustment condition being met S200. The method can additionally include adjusting the system voltage. The method is preferably performed by a computer or ECU. More preferably, the method is performed by the ECU that controls the charge source. The method can allow the EHD system to operate substantially continuously by rapidly lowering the system field magnitude. This is in contrast with prior art EHD systems, which either shut down or become substantially inefficient and/or inoperable when the system field magnitude surpasses a given field magnitude because they are incapable of rapidly restoring the field magnitude to an operable range. This method can be utilized with the EHD system as previously described, or can be utilized with any other suitable system.

Monitoring a parameter indicative of the system field magnitude proximal the energy harvester S100 functions to estimate or determine the system field magnitude at the energy harvester. More preferably, the parameter is indicative of the system field magnitude proximal a charged component or an electrical field generating component of the energy harvester. Charged components and/or electrical field generating components can include the charge source, the downstream collector, the field shaper, or any other suitable charged component of the EHD system. Parameters that can be monitored include: the voltage at which the EHD system holds the charge sources; the system field magnitude as measured by a voltmeter, wherein a first voltmeter lead is located proximal the charge source, and a second lead is located downstream the charge source (e.g. at the downstream collector); the current through a load, wherein the load is coupled between the charge source and the downstream collector; the amount of power extracted and/or provided by the energy harvester; the estimated current, as determined from the number of charged particles generated; the wind speed, wind direction, humidity, or any other suitable environmental parameter. The parameter can be monitored by sensors (e.g. current sensors, voltage sensors, wind vanes, humidity sensors, or any other suitable sensor. In one variation of the method, the controller monitors the parameter. More preferably, the controller receives a measurement of the parameter that is sent from a sensor. The controller can additionally store the measurement with or without auxiliary data (e.g. timestamp, operational conditions, or other parameters) in an associated memory unit (e.g. RAM, flash memory, etc.) for a long or short period of time. The controller is preferably the ECU that controls EHD system operation, but can alternatively be a separate controller.

Adjusting the distance between at least one component of the energy harvester and the electrical ground in response to an adjustment condition being met S200 functions to maintain continuous operation of the EHD system. Adjusting the distance in response to an adjustment condition preferably includes the sub-steps of determining that an adjustment condition has been met S220, and adjusting the distance between the charge source and the electrical ground S240. A controller preferably adjusts the distance between the at least one component and electrical ground. The controller preferably adjusts the distance in response to determining that the adjustment condition has been met, but can alternatively adjust the distance in response to any other suitable condition. The controller preferably adjusts the distance by sending a signal to a drive mechanism that controls a distance element coupled to the component. The controller can additionally determine how much the distance should be adjusted, and/or select which energy harvester component distance should be adjusted. The controller preferably calculates or selects the amount that the distance should be adjusted based on EHD system characteristic dimension(s), system operation parameters (e.g. instantaneous power, current, resistance, temperature, etc.), and/or environmental parameters (e.g. wind speed, humidity, etc.), but can alternatively adjust the distance a predetermined amount regardless of the operating conditions.

Determining that the adjustment condition has been met S220 functions to signal that the EHD system is not operating optimally. This is preferably accomplished by monitoring system performance parameters, such as system efficiency or the amount of power extracted. This is preferably performed by the controller/ECU. The adjustment condition is preferably met when the parameter meets or exceeds a parameter threshold, or goes beyond the boundaries of a parameter range. Substantially instantaneous parameter measurements are preferably used in this determination, but past parameter measurements can alternatively/additionally be used. Past parameter measurements can additionally/alternatively be used in determining a suitable parameter threshold or parameter range. However, the adjustment condition can be otherwise met. Each parameter preferably has at least one associated parameter threshold, and can additionally have auxiliary thresholds, wherein the surpassing the auxiliary threshold can trigger another EHD system action, such as EHD system shutdown.

In a first variation, the adjustment condition is met when the difference between the theoretical determined current and the actual current (current through the load) surpasses a predetermined threshold or goes beyond a predetermined range. In a second variation, the adjustment condition is met when the power extracted by the system falls below a power threshold or goes beyond a predetermined range. In a third variation, the adjustment condition is met when the power extraction rate begins to fall, falls below a rate threshold, or exceeds the boundaries of a rate range. In a fourth variation, the adjustment condition is met when a threshold field magnitude is surpassed. The threshold magnitude can be the field magnitude at which EHD system efficiencies begin to fall, the field magnitude at which the EHD system becomes substantially inoperable (e.g. due to excessive charge shorting to system components), the upper or lower limit of a range of desirable field magnitudes, or any other suitable system field magnitude threshold. The threshold magnitude is preferably dependent on the type of EHD system, the environmental conditions, and the system conditions, but can alternatively be system independent. The threshold magnitude is preferably a single value (e.g. 100,000 V/m), but can be a value range (e.g. 500 V/m-500,000 V/m). Alternatively, the adjustment condition can be met when another system parameter is met, such as wind speed (e.g. the distance is increased when wind speed falls below a threshold speed or lowered when the wind speed rises above a threshold speed), humidity level, amount of on the charged particle, or any other suitable system parameter threshold. In a fifth variation, the adjustment condition is met when two or more parameter measurements surpass their respective thresholds. However, the occurrence of any other suitable event indicative of a decrease in system efficiency and/or power production can cause the adjustment condition to be met.

Adjusting the distance between at least one component of the energy harvester and the electrical ground S240 functions to adjust the system field magnitude proximal the component. The distance between the entire energy harvester and electrical ground is preferably adjusted. However, individual component distances to the electrical ground can alternatively be individually adjusted, adjusted in tandem, or adjusted simultaneously with other component distances. For example, the charge source distance can be decreased while the field shaper distance is increased. Energy harvester components that are preferably adjusted include the charge source, the field shaper, the downstream collector, or any other suitable charged component of the energy harvester.

The energy harvester is preferably moved relative to a substantially static ground (e.g. the ground or a mounting surface), but the electrical ground can alternatively be moved relative to a substantially static energy harvester. Alternatively, both the energy harvester and electrical ground can be moved. In one variation of the method, the energy harvester can be located on a telescoping pole, wherein the ground or mounting surface (e.g. Earth) functions as electrical ground. The length of the telescoping pole can be increased or decreased to increase or decrease the distance between the charge course and electrical ground, respectively.

Adjusting the distance between at least one component of the energy harvester and the electrical ground preferably further includes taking parameter measurements. The parameter measured is preferably that measured in determining the adjustment condition, but can alternatively include one or more measurements of another system parameter. Successive measurements can be of the same parameter, or can be of different parameters. The measurements are preferably measured by one or more sensors, and received and compared to their respective parameter threshold by the controller. In one variation of the method, the controller receives a parameter measurement and compares the measurement to the respective parameter threshold (e.g. set threshold, threshold selected from a chart, etc.). The controller preferably specifies the increment by which the distance should be adjusted, but the increment can alternatively be specified by the drive mechanism, the distance element, or any other suitable EHD system component. Alternatively, the controller sends a signal to increase the distance to a predetermined distance (e.g. to nine times the characteristic dimension, to the equilibrium distance, etc.). However, the distance can be adjusted in any suitable manner.

The distance is preferably adjusted in response to the adjustment condition being met, but can be adjusted to satisfy other conditions. For example, the distance can be adjusted to achieve the desired wind speed, wind direction, rest/equilibrium position (e.g. wherein the equilibrium position is at least eight times the diameter/width of the field shaper), or any other suitable condition. The distance is preferably increased until a cessation condition is met. The cessation condition is preferably met when the measured parameter falls within the parameter threshold. For example, the distance can be incrementally increased until the desired power output is achieved, until the difference between the theoretical and measured current falls below a given threshold, until the power production rate reaches or exceeds a desired threshold, or until the estimated system field magnitude at the charge source has fallen below a given threshold. The adjusted distance is preferably maintained for a period of time after the cessation condition is met, but can alternatively be immediately adjusted after a restitution condition is met. The restitution condition preferably includes all the system parameters falling within the respective thresholds, but can alternatively include select system parameters falling within their respective thresholds, satisfaction of a time limit, or any other suitable condition indicative of system restoration to desired operational conditions.

Distance adjustment preferably includes increasing the distance between the at least one energy harvester component and the electrical ground S242. The distance is preferably increased in response to the adjustment condition being met, wherein the controller sends a drive mechanism a signal to increase the distance. The controller preferably repeatedly measures the parameter and incrementally increases the distance a predetermined distance until the cessation condition is met. Alternatively, distance can be increased to a predetermined distance, wherein the predetermined distance is selected from a table based on the instantaneous system and environment conditions (e.g. wind speed), or is the equilibrium position. Alternatively, the distance can be increased at a predetermined rate until the cessation condition is met. However, the distance can be increased in any suitable manner.

Adjusting the distance between at least one component of the energy harvester and the electrical ground can additionally/alternatively include decreasing the distance between the energy harvester and electrical ground S244. The distance of the energy harvester is preferably decreased as a whole, but the distance of individual components can alternatively be adjusted. The component whose distance is decreased is preferably, but is not necessarily, the component whose distance is increased. The distance is preferably decreased after the cessation condition has been met, but can alternatively be decreased when any suitable condition is met. The distance is preferably decreased after a predetermined period of time has passed since the cessation condition was met, but can alternatively be decreased immediately or as soon as the system parameters allow (e.g. a restitution condition is met). The distance can be decreased to a predetermined distance, wherein the predetermined distance can be selected from a chart, calculated from measured system parameters, or be the equilibrium position. Alternatively, the distance can be decreased an incremental distance, decreased at a predetermined rate, or decreased in any suitable manner. Distance decreasing is preferably ceased when the distance reaches the equilibrium position, but can alternatively be ceased when an adjustment condition is detected.

In one variation, the distance is gradually decreased after the distance had been increased, and the distance is preferably gradually decreased until a predetermined equilibrium position is reached or an adjustment condition is met. Periodic measurements are preferably taken during the duration of distance decrease and compared by the controller to their respective parameter thresholds. Distance decrease is preferably triggered by the satisfaction of a restitution condition, wherein the estimated system field magnitude proximal the charged component begins falling (after the distance had been increased), and/or when the system performance begins improving. In a second variation, the distance is decreased to an equilibrium position when the EHD system is shut off. In a third variation, the distance is decreased until an adjustment condition is met. For example, the distance can be decreased until the extracted power falls below a desired power threshold. In this example, the distance can then be increased until the extracted power meets or exceeds the desired power threshold, at which point the distance can be maintained. In a fourth variation, the distance is decreased as long as the parameter satisfies the given threshold. However, the distance can be decreased to accommodate for environmental conditions (e.g. high wind speed), system conditions, or any other suitable parameter.

The method can additionally include adjusting the system voltage S300. Adjusting the system voltage can function to control the power extracted by the system, and can additionally function to adjust the system field magnitude proximal energy harvester. The system voltage is preferably increased while the system field magnitude is determined/estimated to be within an operational range (e.g. below the adjustment condition), and is preferably decreased when the system field magnitude is determined/estimated to have exceeded the threshold magnitude. The system voltage can additionally be adjusted to meet any other suitable system parameter. The system voltage and distance between the energy harvester components and electrical ground can be simultaneously adjusted, adjusted in tandem, or adjusted in any suitable order. The system voltage is preferably increased by increasing the charging voltage, but can alternatively be increased by decreasing the voltage of the downstream collector, decreasing the amount of power pulled from the EHD system, or through any other suitable means. Similarly, the system voltage can be decreased by decreasing the charging voltage, increasing the downstream collector voltage, decreasing the charged particle emission rate or increasing the amount of power pulled from the system. In a first variation, the system voltage is adjusted to a predetermined voltage when the distance between the charge source and electrical ground is adjusted to a given distance. In a second variation, the system voltage is incrementally adjusted until a desired system parameter is met. For example, the system voltage is incrementally adjusted (increased and/or decreased) until the power output reaches 5 kW. In a third variation, the system voltage can be adjusted when the wind speed falls below a velocity threshold. System voltage adjustment is preferably controlled by the controller/ECU, but can be otherwise controlled.

The method can additionally include placing the energy harvester at an initial position relative to electrical ground. The energy harvester is preferably initially positioned at the equilibrium distance, but can alternatively be set at any suitable distance. For example, the initial distance can be shorter than the equilibrium distance, particularly when the measured system and/or environmental parameters are within their respective thresholds. The controller preferably controls the energy harvester initial position, but the initial position can alternatively be set passively (e.g. is the rest position of the adjustment element). The initial position and/or the equilibrium distance can be determined from the physical attributes of the EHD system (e.g. from a characteristic dimension), system operating parameters, environmental parameters (e.g. wind velocity, wind direction, humidity, etc.), or any other suitable parameter. The equilibrium distance can be calculated, selected from a chart, or determined in any suitable manner.

As a person skilled in the art will recognize from the previous detailed description and from the figures and claims, modifications and changes can be made to the preferred embodiments of the invention without departing from the scope of this invention defined in the following claims.

We claim:

1. An electrohydrodynamic system comprising:
an energy harvester configured to extract energy from a fluid stream, the energy harvester comprising:
 a charge source configured to introduce charged particles into the fluid stream;
 a field shaper having a characteristic dimension, the field shaper arranged downstream from the charge source along the fluid stream;
a member supporting a component of the energy harvester a distance from electrical ground, the distance being at least eight times the characteristic dimension of the field shaper, wherein the member is adjustable and controls the distance between the component of the energy harvester and electrical ground; and
a controller configured to control the member in response to an operational parameter measurement, wherein the operational parameter measurement comprises a parameter indicative of electric field magnitude proximal the charge source.

2. The system of claim 1, wherein the field shaper generates an electric field having a direction that promotes particle movement with the fluid stream.

3. The system of claim 2, wherein the charge source comprises an injector and an electrode coupled to the injector.

4. The system of claim 1, wherein the characteristic dimension comprises a largest physical dimension of the field shaper.

5. The system of claim 4, wherein the field shaper is ellipsoid and the characteristic dimension is a major axis of the field shaper.

6. The system of claim 1, wherein the component of the energy harvester supported by the member comprises the field shaper.

7. The system of claim 1, wherein the energy harvester further comprises a downstream collector and a load electrically connected between the charge source and the downstream collector.

8. The system of claim 1, further comprising a drive mechanism, connected to the member, that controls member adjustment.

9. The system of claim 1, wherein the controller sends a signal to increase the distance between the component and electrical ground in response to the operational parameter measurement surpassing a boundary of a predetermined range.

10. The system of claim 9, wherein the controller sends a signal to decrease the distance between the component and electrical ground in response to a second measurement of the operational parameter that falls within the boundaries of the predetermined range.

11. The system of claim 1, wherein the member comprises a telescoping pole.

12. The system of claim 1, wherein a portion of the member proximal the charge source is curved.

13. The system of claim 1, wherein the member is mounted to the electrical ground.

14. An energy harvesting system comprising:
an energy harvester having a characteristic dimension, the energy harvester comprising:
 a charge source that introduces charged particles of a single polarity into a fluid stream, charged particle flow away from the charge source inducing a first electric field; and
 a field shaper configured to induce a second electric field opposing the first electric field;
a distance element that controls a distance between a component of the energy harvester and electrical ground, the distance being at least eight times the characteristic dimension of the energy harvester, wherein the distance element is adjustable and adjusts the distance between the component of the energy harvester and electrical ground;
a sensor configured to measure a system parameter; and
a controller configured to control distance element adjustment based on the system parameter measurement, wherein the system parameter measurement comprises a parameter indicative of electric field magnitude proximal the charge source.

15. The system of claim 14, wherein the characteristic dimension of the energy harvester comprises a major axis of the field shaper.

16. The system of claim 14, wherein the charge source comprises an injector and a charging rail, and the field shaper comprises a structure circumscribing the injector.

* * * * *